United States Patent [19]

Oxley et al.

[11] Patent Number: 4,842,022
[45] Date of Patent: Jun. 27, 1989

[54] SPLICED STUFFABLE CELLULOSIC FOOD CASING

[75] Inventors: Jeffery A. Oxley, Naperville; Darrel L. Wilhoit, Worth, both of Ill.

[73] Assignee: Viskase Corporation, Chicago, Ill.

[21] Appl. No.: 176,005

[22] Filed: Mar. 31, 1988

[51] Int. Cl.⁴ ............................................. F16L 11/12
[52] U.S. Cl. .................................. 138/118.1; 138/120; 138/155; 156/304.2; 156/304.3; 428/57; 428/61
[58] Field of Search .................... 138/118.1, 120, 155, 138/177, 178; 426/105, 135, 138; 285/18, 293, 370, 397, 915; 428/57, 61, 343, 409, 36, 212, 34.8; 156/158, 294, 304.2, 304.3, 304.6, 304.1

[56] References Cited
U.S. PATENT DOCUMENTS 1,195,430  8/1916  Angier .
2,098,909 11/1937  Angier .
3,073,734  1/1963  Bemmels .
3,597,300  8/1971  Miller .
4,032,176  6/1977  Tabary .................................. 285/18
4,391,302  7/1983  Huhn et al. ....................... 138/118.1
4,610,742  9/1986  Rop et al. .......................... 138/118.1
4,736,775  4/1988  Oxley .

Primary Examiner—James E. Bryant, III
Attorney, Agent, or Firm—Roger Aceto

[57] ABSTRACT

An anisotropic pressure sensitive adhesive tape for splicing cellulosic casing which includes a highly extensible isotropic backing and a plurality of filaments arranged on the backing. The filaments are arranged to restrain the extensibility of the tape in one direction so as to produce an anisotropic tape wherein the ratio of longitudinal to transverse stretch is on the order of 10:1 to 20:1.

10 Claims, 2 Drawing Sheets

SPLICED STUFFABLE CELLULOSIC FOOD CASING

TECHNICAL FIELD

The present invention relates generally to spliced cellulosic food casings and to a pressure sensitive adhesive tape for splicing together lengths of food casing wherein the splice tape has a ratio of longitudinal to transverse extensibility of between about 10:1 to 20:1.

BACKGROUND OF THE INVENTION

Sausage casings of regenerated cellulose are well known in the art. Cellulosic casings are of several different types and sizes to accommodate the different categories of food products to be prepared. These casings also are provided in supported or unsupported form, the supported casings, commonly referred to as "fibrous casings", having a fibrous support web embedded in the casing wall.

For convenience in handling, casings which may be 20 to 70 m or more in length are shirred and compressed to produce what is commonly referred to as "shirred casing sticks" which measure about 20 cm to about 70 cm in length.

Fibrous casings are commonly used in the preparation of food products such as salami and bologna sausages, meat loaves, cooked and smoked ham and smoked pork butts and the like. These casings are produced in stuffed diameter sizes from about 50 mm to about 200 mm or larger.

Generally, a fibrous casing contains about 25% to 35% of a polyol (such as glycerine) based on the dry weight of the cellulose in the casing as a humectant and softening agent. The casing also contains about 17% to 35% moisture based on total weight of the casing. At this moisture level the fibrous casing can be shirred and will contain enough moisture to permit stuffing the casing without adding further moisture. The preferred moisture content of the fibrous casing depends upon the type of product to be stuffed in the casing. For example, for boneless hams, a preferred range is from about 20% to about 26% moisture based on total casing weight whereas for a meat emulsion the preferred range is from about 17% to about 23%. In any event, it should be appreciated that a fibrous casing which in its as-sold condition is ready for stuffing contains an appreciable amount of both polyols (e.g., glycerine) and moisture.

For purposes of present day automatic stuffing machines it is preferred to provide a shirred stick containing as long a length of casing as possible. However, for various reasons it is not always possible to provide a single continuous length of casing long enough to produce a shirred stick. Accordingly, it is common for a casing manufacturer to join together shorter lengths of casings so that each shirred stick may contain one or more splices.

Having one or more splices in a length of shirred casing is not desirable. This is because the splices interfere with the stuffing procedure, especially in present day high speed automatic stuffing machines. These machines subject the casing to considerable longitudinal and transverse stresses which cause the splice to fail. Consequently, it is not uncommon to interrupt the stuffing operation to clear and remove the splice before it is stuffed.

The problem is particularly acute when using a stuffing method which requires circumferentially stretching the casing just prior to the introduction of the foodstuff into the casing. Reference is made to U.S. Pat. No. Re. 30,390 for a description of a conventional automatic stuffing machine which circumferentially stretches the casing prior to stuffing. As disclosed in U.S. Pat. No. Re. 30,390, casing is deshirred and drawn forward from a shirred supply by the introduction of the food product into the casing. As the casing deshirrs, it passes over a so-called "sizing disc" which has an outer periphery larger in circumference than the unstretched inner periphery of the casing. This causes the casing to stretch circumferentially as much as 15% as it traverses the disc. Moreover, the act of drawing the casing over the disc and stretching it creates a drag or "holdback" on the casing which retards the forward progression of the casing and longitudinally stresses the casing.

A splice in the casing causes several problems. If a pressure sensitive adhesive tape used in making the splice has a low extensibility, it may not be able to accomodate the circumferential stretching of the casing and may break as the splice passes over the sizing disc. If the tape does not break, its lack of extensibility can prevent it from passing over the disc so as to slow or even stop the forward progression of the casing over the disc. Retarding the forward progress of the casing in this fashion increases the drag or holdback on the casing. The resulting increase in longitudinal stress can cause either an adhesive or a cohesive failure of the tape or the casing may break. In an adhesive failure, the tape peels from the casing, whereas in a cohesive failure the tape adhesive fails in shear, leaving a portion of the adhesive adhered to the casing and a portion adhered to the tape backing. In either case, the splice opens.

If the tape is so extensible that it can stretch sufficiently to pass over the disc, the splice may fail in another mode. This is because the drag created as the splice passes over the sizing disc causes the tape to stretch in the direction of casing movement. This stretch in the direction of casing movement pulls apart the adjacent spliced together ends of the casing and creates a gap between the adjacent casing ends which is bridged by the stretched tape. This may be objectionable because it exposes the food within the casing to the adhesive which typically is not approved for direct food contact.

Accordingly, an acceptable pressure sensitive splice tape for use with a shirred fibrous casing must satisfy several requirements. The tape, of course, must have an adhesive component that provides good adherence to the polyol and moisture containing casing. The tape also must be extensible so as to withstand the rigors of shirring and accommodate the circumferential expansion of the casing of up to 15% or more to permit the splice to clear a sizing disc during stuffing; and the tape must not be so extensible that it permits the adjacent ends of the spliced casings to pull apart when the casing is subjected to a drag or holdback which retards the forward progression of the casing.

An ideal splicing tape for cellulosic casing would adhere to the casing by pressure alone, would be capable of accommodating up to 15% or more circumferential stretching of the casing and would resist the longitudinal (machine direction) tensile forces tending to pull the splice apart. Thus, the stretch characteristics of an ideal splicing tape must be anisotropic in that it must be extensible in its longitudinal direction and relatively unextensible in its transverse direction. It is important to note that when the splice tape is in position and holding the joined ends of casing together, the tape is oriented so that in its longitudinal direction the tape accommodates the circumferential stretch of the casing whereas in its transverse direction, the tape resists the forces tending to longitudinally pull apart the joined ends of casing.

Accordingly, an object of the present invention is to provide an anisotropic pressure sensitive adhesive tape suitable for use in joining lengths of fibrous cellulosic food casings.

Another object is to provide such a tape suitable for making a stuffable splice.

Still another object is to provide a spliced fibrous cellulosic casing formed by an anisotropic pressure sensitive adhesive tape which permits the joined together ends of the fibrous casings to stretch circumferentially by 15% or more and which resists the longitudinal separation of the joined ends of the casing.

A further object of the present invention is to provide an anisotropic pressure sensitive tape.

Yet another object of the present invention is to provide an anisotropic pressure sensitive adhesive tape wherein the extensibility of the tape in its longitudinal direction is 10 to 20 times its extensibility in a transverse direction.

SUMMARY OF THE INVENTION

In one embodiment the present invention is a stuffable spliced food casing comprising:

(a) first and second lengths of a tubular fibrous casing having adjacent ends longitudinally aligned and at least abutting one against another, and each of said lengths having a moisture content of at least 17% based on total casing weight;

(b) a pressure sensitive adhesive tape disposed against said lengths in only a pressure sensitive adhering relationship and said tape encircling and overlapping said adjacent ends such that the longitudinal axis of said tape is disposed transverse the longitudinal axis of said casing lengths to join said casing lengths together and form a splice; and (c) said adhesive tape including an anisotropic backing strip capable of stretching at least 500% in its longitudinal direction and not more than 50% in its transverse direction.

In another embodiment of the invention the spliced food casing comprises casing lengths joined as setout above wherein the adhesive tape disposed against said lengths in only a pressure sensitive relationship includes an anisotropic backing strip composed of an elastomeric isotropic film capable of stretching at least 500% in both its longitudinal and transverse directions; and spaced longitudinally along said strip, a plurality of filaments arranged transverse the longitudinal axis of said backing strip, said filaments being intimately associated with said backing strip and being less extensible than said backing strip and constituting restraining means for limiting the transverse elongation of said strip to not more than 10% of the longitudinal elongation thereof and the splice composed of said casing lengths and adhesive tape being circumferentially expandable but restrained by said filaments from expanding in the direction of the longitudinal axis of said casing lengths so as to maintain at least an abutting relationship of said adjacent ends during stuffing and circumferential expansion of said casing.

In a further embodiment, the invention comprises a pressure sensitive adhesive tape comprising:

(a) an anisotropic backing strip capable of stretching at least 500% in its longitudinal direction and not more than 50% in its transverse direction; and (b) a pressure sensitive adhesive on at least one surface of said strip.

In a yet further embodiment, the invention comprises a pressure sensitive adhesive tape as set out above wherein the anisotropic backing strip is composed of an isotropic elastomeric film capable of stretching at least 500% in both its longitudinal and transverse directions and a plurality of spaced apart filaments arranged transverse the longitudinal axis of said backing strip and intimately associated with said backing strip, said filaments having a percent of elongation which is less than the percent elongation of said isotropic elastomeric film and constituting means for restraining the transverse elongation of any given length of said strip to not more than 10% of its longitudinal elongation.

In the invention, a pressure sensitive tape used for splicing lengths of fibrous cellulosic casing is composed of an adhesive and a backing. The adhesive must be sufficiently aggressive for adhesion to fibrous casing having a moisture content of at least 17% by total weight. Preferably, adherence is accomplished by pressing the adhesive tape against the casing in a "semi-finished" or relatively dry condition wherein the casing has a moisture content of only about 10% based on total casing weight. Thereafter, the casing can be moisturized to bring its moisture up to the level required for stuffing. As set out hereinabove, this moisture content varies depending on the final end use of the casing, but generally is in the range of about 17% to 35%.

One adhesive found to be sufficiently aggressive to adhere to a moisturized casing is an acrylic based adhesive as provided on a Patco Corporation No. 503A tape. The adhesive, according to spectrographic analysis is 2-ethylhexlacrylate with minor amounts of polyvinylacetate. Another suitable adhesive is Adhesive Research, Inc. Adhesive No. WS 27. Analysis of this adhesive shows it is an alkylphenol initiated polyethylene oxide ether terminated with a carboxylic acid/ester.

The backing material is characterized by having a high degree of extensibility in its longitudinal direction before breaking and very limited extensibility in its transverse direction. Even though the cellulosic casing only is stretched circumferentially up to about 15% during certain stuffing operations, it has been found that the longitudinal extensibility of the tape must be several orders of magnitude greater. This high degree of tape extensibility will allow the tape to accommodate the relatively small stretch of the casing of up to about 15% with little or no resistance. Accordingly, a suitable backing material is one having in its longitudinal direction an extensibility of 500% to 1100% or more before breaking and a modulus of elasticity of not more than about 5000 psi and preferably less than 1000 psi.

Another characteristic of the backing is that it must be anisotropic so that its extensibility in its longitudinal direction is much greater, and preferably 10 to 20 times greater than in a transverse direction. This anisotropic characteristic will allow the tape to accommodate the circumferential stretch of the casing while holding together the adjacent ends of the spliced casing lengths.

A suitable backing having these desired properties can be obtained using an isotropic elastomeric film which has an extensibility of over 500% in both its longitudinal and transverse direction and then modifying the film to provide it with the desired anisotropic properties. Examples of an isotropic elastomeric film having the desired extensibility include a thermoplastic styrene butadiene rubber sold by Shell Oil Company under the trademark KRATON, which has a modulus of elasticity of about 250 psi and an elongation at break of about 1300%. Other suitable materials include thin coat natural or synthetic rubber elastomeric films or silicone rubber films.

Another example of a suitable elastomeric backing material is a polymeric film such as a polyurethane film having both a machine direction and transverse direction elongation of about 1100% before breaking and a modulus of elasticity of not more than about 5000 psi.

Elastomeric films or polymeric films such as polyurethane generally are not anisotropic. While such films can be made with some degree of orientation, they cannot be made with a stretch in one direction which is significantly different from the stretch in a transverse direction.

An isotropic, highly extensible film is made anisotropic by intimately associating filaments, or other reinforcing media with the backing. These filaments are spaced along the backing and are arranged transverse to the longitudinal axis of the backing. The filaments are less extensible than the film and therefore constitute means to restrain the ability of the backing to stretch in one direction. With this arrangement the backing is free to stretch in a longitudinal direction but is restrained by the filaments from stretching in a transverse direction.

Filaments suitable for use as restraining means include plastic monofilaments such as Nylon line, or twisted threads such as cotton and polyester threads and the like. The filaments can be incorporated into the tape in a number of ways. For example, a plastic filament can be extruded or applied as a hot melt to the backing. Filaments also can be glued or otherwise attached to the backing, or they can be pressed into the adhesive surface of the tape. As another alternative, the tape can be laminated wherein the filaments are incorporated between the laminations. In any case, it is preferred that the type, number and distribution of the filaments be sufficient to restrain the extensibility of the tape in its transverse direction to not more than 10% of its extensibility in the direction of the longitudinal axis of the tape. Most preferred is a ratio of longitudinal to transverse elongation of between about 10:1 and 20:1.

DRAWINGS

DETAILED DESCRIPTION OF THE INVENTION

Figure 1:
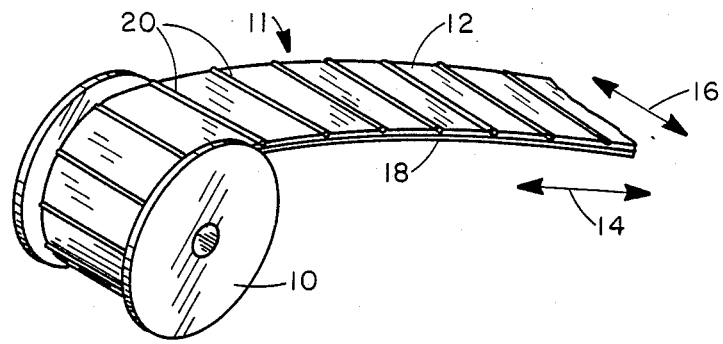
FIG. 1 is a perspective view showing a roll of the tape of the present invention.

Referring to the drawings, FIG. 1 shows a roll 10 of the splice tape 11 of the present invention. The tape includes a backing strip 12 preferably composed of a strip of isotropic polymeric film having an extensibility (stretch) until breaking greater than about 500% in both its longitudinal and transverse directions (arrows 14 and 16 respectively). Disposed on and covering one surface of the backing strip is a pressure sensitive adhesive layer 18. In instances where the tape does not have release properties with itself, a release liner, (not shown) must be used to prevent blocking of the layers in the roll.

Incorporated into the adhesive tape are a plurality of filaments 20. These filaments are of a material having an extensibility much less than the extensibility of the polymeric film comprising the backing strip 12. Filaments 20 are spaced along and are oriented transverse the tape longitudinal axis. The filaments also are intimately associated with the tape so as to resist the extensibility of the tape in the transverse direction 16 without significantly reducing the tape extensibility in the longitudinal direction 14. Preferably, filaments 20 will limit the transverse extensibility of the tape to not more than 10% of the longitudinal extensibility of the tape. The filaments 20 most preferably restrain the extensibility of the composite article to the extent that the ratio of longitudinal to transverse extensibility is on the order of 10:1 to 20:1.

Figure 2:
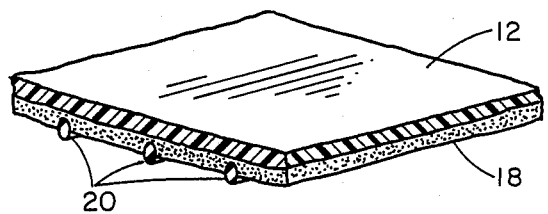
FIGS. 2–4 are cross-sectional views in perspective, showing alternate embodiments of the tape of the present invention.
Figure 3:
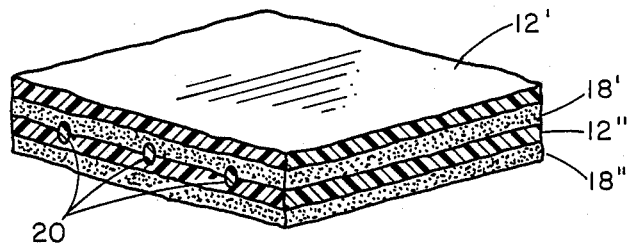

The intimate association of filaments 20 with the tape is accomplished in several fashions. As shown in FIG. 2, the filaments 20 are retained within the adhesive layer 18 of the tape. This can be done by pressing the fibers into the adhesive layer or by pressing the fibers under heated conditions directly onto the backing and then laying down the adhesive layer. In FIG. 3, the tape is a laminate formed by superimposing two tapes each composed of a backing strip 12′, 12″ and an adhesive layer 18′, 18″. In the lamination as shown in FIG. 3, the adhesive 18′ of one tape is pressed against the backing strip 12″ of the second tape. Disposed between the two tapes are the filaments 20.

Figure 4:
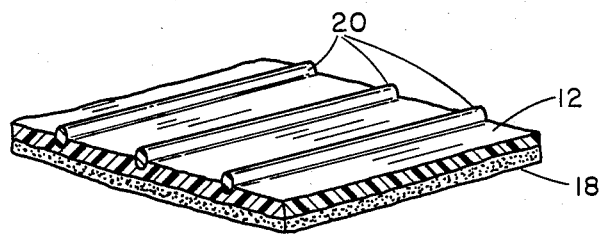

In the embodiment of FIG. 4, the filaments 20 are formed by extruding, or otherwise applying, a thermoplastic material such as Nylon or polyester, directly onto the backing strip 12. In this fashion, the individual filaments 20 are thermoplastically bonded directly to the backing strip.

To make a splice, the casing lengths 30,32 to be joined (FIG. 5) are axially aligned so that their adjacent ends 34,36 at least abut one against another so there is no space or gap between the adjacent ends. An alternative is to telescope the end 34 of the casing length which leads in the direction of stuffing (as indicated by arrow 38) into the end 36 of the length 32 which trails in the direction of stuffing. With the two casing lengths in this position, the splice tape 11 is wrapped around and pressed against the casing lengths to encircle and overlap the adjacent casing ends 34,36 thereby joining them together to form a spliced casing.

Figure 5:
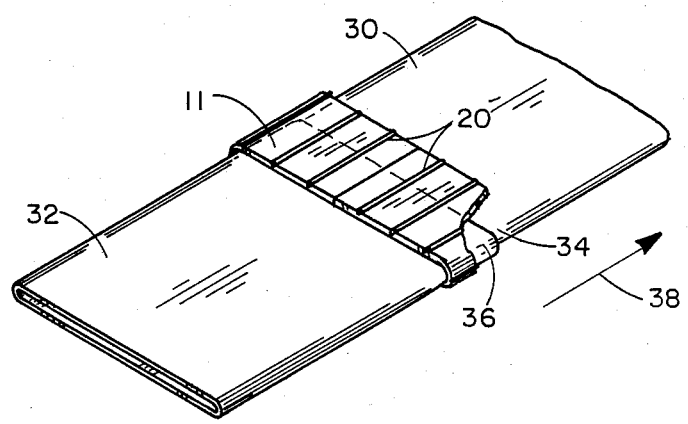
FIG. 5 is a perspective view showing a joining of two lengths of casing using the tape of the present invention.
Figure 6:
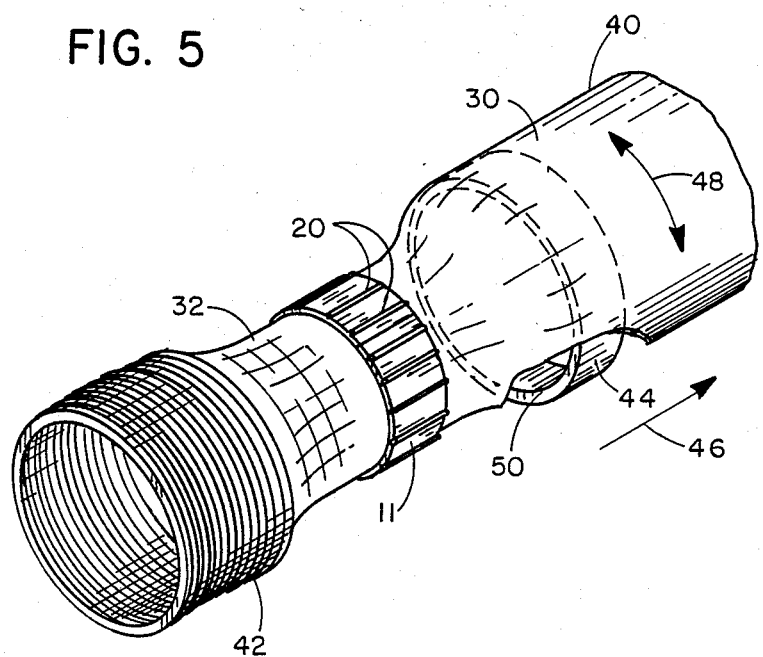
FIG. 6 is a perspective view showing the deshirring of a spliced casing over a sizing disc.

FIG. 6 shows a spliced casing 40 in use. The casing is drawn forward from a shirred supply 42 and over a sizing disc 44 in a stuffing direction (as indicated by arrow 46) which is in the direction of the longitudinal axis of the casing. As shown in FIG. 6, the orientation of the filaments 20 in the splice tape 11 will not interfere with the extension of the tape to accommodate circumferential stretching of the casing as it passes over the sizing disc during stuffing. This is because the circumferential stretch (as indicated by arrow 48) is in the longitudinal direction of the splice tape 11. However, stress in the longitudinal or stuffing direction 46, which tends to pull the splice apart, is restrained by the filaments 20 which are oriented in the tape transverse direction. The resistance to stretching of the tape in its transverse direction is important to prevent the adjacent ends 34,36 (FIG. 5) of the casing lengths 30,32 from parting so as to expose the meat product within the casing to the adhesive surface of the tape.

To further insure that such exposure does not occur, the adjacent ends of casing lengths 30,32 can be telescoped one into another as shown in FIG. 5. When the lengths are telescoped, the length 30 which leads in the direction of stuffing should have its end 34 telescoped into the end 36 of the length 32 which trails in the direction of stuffing. This arrangement prevents an exposed edge of one casing length from catching on an edge 50 of the sizing disc as the casing passes over the disc.

EXAMPLE I

An Adhesive Research Inc. (ARI) tape No. 7234 can be used to demonstrate the present invention. This tape has a 3 mil polyurethane backing which is isotropic. The modulus of elasticity of the tape is about 2500 psi at 300% stretch and the extensibility of the tape in both its longitudinal and transverse directions before breaking is about 1000%. The pressure sensitive adhesive on the polyurethane backing is an ARI WS 27 adhesive. This adhesive by analysis is an alkylphenol initiated polyethylene oxide ether terminated with a carboxylic acid/ester.

Lengths of this ARI tape measuring 14 inches by 2 inches are modified by laying strands of a No. 60 polyester household sewing thread onto the adhesive surface. The strands are laid transverse the longitudinal axis of the tape at intervals of about 0.25 inch (see FIG. 2).

The resulting tape is anisotropic in that its extensibility in the tape longitudinal direction (i.e., the direction of circumferential stretch 48 in FIG. 6) remains at about 1000% whereas its extensibility in the tape transverse direction (i.e., the direction of stuffing as shown by arrow 46 in FIG. 6) is less than about 50%. Thus, the tape including transverse strands of polyester threads as a stretch restraining means has a ratio of longitudinal-to-transverse extensibility of about 20:1.

Pieces of tape prepared in a manner as described above were used to make twenty-four casing splices to form one continuous casing length four hundred feet long. The inflated diameter of the casing was about 4.05 inches and its moisture content at the time of splicing was about 8.5% based on total weight. The casing was moisturized and shirred in a conventional manner on a floating mandrel shirring machine. None of the splices failed during shirring. After shirring, the casing was found to have a moisture content of about 24.3%.

After shirring, a stuffing operation was simulated by deshirring and pulling the casing over a sizing disc 4.61 inches in diameter so as to circumferentially stretch the casing about 13.8%. Casing was pulled forward over the sizing disc until five (5) splices cleared over the disc. None of the splices failed. This demonstrated that the tape was sufficiently extensible to accommodate the circumferential stretch of the casing during stuffing but that its extensibility in the casing longitudinal direction (tape transverse direction) was low enough to prevent the joined ends of casing from pulling apart. Since the joined ends did not pull apart, the adhesive was not exposed to the interior of the casing.

We claim:

1. A stuffable spliced food casing comprising:
   (a) first and second lengths of a tubular fibrous casing having adjacent ends longitudinally aligned and at least abutting one against another, and each of said lengths having a moisture content of at least 17% based on total casing weight;
   (b) a pressure sensitive adhesive tape having a length longer than its width, said tape composed of a backing strip and an adhesive on at least one surface of said backing strip, and said adhesive tape disposed against said lengths in only a pressure sensitive adhering relationship and encircling and overlapping said adjacent ends such that the longitudinal axis of said tape is disposed transverse the longitudinal axis of said casing lengths to join said casing lengths together and form a splice; and
   (c) said adhesive tape backing strip being stretchable at least 500% in the tape longitudinal direction and restraining means disposed along said backing strip for rendering said tape stretchable not more than 50% in the tape transverse direction.

2. A spliced food casing as in claim 1 wherein said backing strip comprises:
   (a) an isotropic elastomeric film capable of stretching at least 500% in both its longitudinal and transverse directions; and
   (b) spaced longitudinally along said backing strip, a plurality of filaments arranged transverse the longitudinal axis of said backing strip, said filaments being intimately associated with said backing strip and being less extensible than said backing strip and constituting restraining means for limiting the transverse elongation of said strip to not more than 10% of the longitudinal elongation thereof, and said splice comprising said casing lengths and tape being circumferentially expandable but restrained by said filaments from expanding in the direction of the longitudinal axis of said casing lengths so as to maintain at least an abutting relationship of said adjacent ends during stuffing and circumferential expansion of said casing.

3. A spliced food casing as in claim 2 wherein said backing strip is polyurethane.

4. A spliced food casing as in claim 2 wherein said pressure sensitive tape has a ratio of longitudinal to transverse elongation of between about 10:1 and 20:1.

5. A spliced casing as in claim 2 wherein said backing includes two plies of said film and said filaments are laminated between said plies.

6. A spliced casing as in claim 2 wherein said filaments are selected from the group consisting of plastic monofilaments, twisted plastic threads, and twisted threads of natural fibers.

7. A spliced casing as in claim 2 wherein the moisture content of said casing is in the range of 17–35% based on total weight.

8. A spliced casing as in claim 7 wherein said adhesive is an alkylphenol initiated polyethylene oxide ether terminated with a carboxylic acid/ester.

9. A stuffable spliced food casing comprising:
   (a) first and second lengths of a tubular fibrous casing having adjacent ends longitudinally aligned and at least abutting one against the other, and each of said lengths having a moisture content of at least 17% based on total casing weight;
   (b) a pressure sensitive adhesive tape disposed against said lengths in only pressure sensitive adhering relationship, said tape having a length longer than its width and encircling and overlapping said adjacent ends such that the longitudinal axis of said tape is disposed transverse the longitudinal axis of said casing lengths to join said lengths together and form a splice;

(c) said adhesive tape including a backing strip composed of an isotropic elastomeric film stretchable in both the tape longitudinal and transverse directions, and an adhesive on at least one surface of said strip; and (d) stretch restraining means disposed along said backing strip at spaced intervals and extending transverse the longitudinal axis of said tape, said stretch restraining means restricting the transverse direction elongation of said tape to not more than 10% of the longitudinal direction elongation of said tape.

10. A stuffable spliced food casing comprising:

(a) first and second lengths of a tubular fibrous casing having adjacent ends longitudinally aligned and at least abutting one against another, and each of said lengths having a moisture content of at least 17% based on total casing weight;

(b) a pressure sensitive adhesive tape having a length longer than its width, said tape including a backing strip and an adhesive on at least one surface of said backing strip, and said tape being disposed against said lengths in only a pressure sensitive adhering relationship and encircling and overlapping said adjacent ends such that the longitudinal axis of said tape is disposed transverse the longitudinal axis of said casing lengths to join said casing lengths together and form a splice;

(c) said backing strip composed of an isotropic elastomeric film stretchable at least 500% in both the longitudinal and transverse directions of said film; and (d) a plurality of filaments spaced along said backing strip and arranged transverse the longitudinal axis of said backing strip, and said filaments being intimately associated with said backing strip and being less extensible than said backing strip and constituting restraining means for limiting the transverse elongation of said strip to not more than 10% of the longitudinal elongation thereof, and said splice comprising said casing lengths and tape being circumferentially expandable but restrained by said filaments from expanding in the direction of the longitudinal axis of said casing lengths so as to maintain at least an abutting relationship of said adjacent ends during stuffing and circumferential expansion of said casing.

* * * * *